United States Patent [19]

Langrand et al.

[11] Patent Number: 5,233,656

[45] Date of Patent: Aug. 3, 1993

[54] TELEPHONE INSTALLATION FOR THE REMOTE LOADING OF TELEPHONE RENTAL DATA OF AN INDEPENDENT STATION

[75] Inventors: Franck Langrand; Gérald Mazziotto; Sophie Baudoux, all of Paris, France

[73] Assignee: France Telecom - Centre National d'Etudes des Telecommunications, Moulineaux, France

[21] Appl. No.: 706,041

[22] Filed: May 28, 1991

[30] Foreign Application Priority Data

May 29, 1990 [FR] France ................. 90 06662

[51] Int. Cl.$^5$ .............................. H04K 1/00
[52] U.S. Cl. ...................... 380/23; 380/21; 380/24; 380/25
[58] Field of Search ................. 380/23-25, 380/21

[56] References Cited

U.S. PATENT DOCUMENTS

| | | | |
|---|---|---|---|
| 4,123,747 | 10/1978 | Lawcto et al. | 380/25 |
| 4,555,805 | 11/1985 | Talbot | 380/23 |
| 4,771,461 | 9/1988 | Matyas | 380/24 |
| 5,029,208 | 7/1991 | Tanaka | 380/21 |
| 5,060,264 | 10/1991 | Muellner et al. | 380/23 |
| 5,073,932 | 12/1991 | Yossifor et al. | 380/23 |
| 5,077,790 | 12/1991 | D'Amico et al. | 380/23 |

OTHER PUBLICATIONS

Electrical Communication, vol. 63 (1989), No. 4, pp. 389-399; M. Ballard et al: "Cellular Mobile Radio as an Intelgent Network Application" (Brussels, Belgium).
Premier Colloque International sur L'Intelligence Dans les Reseaux, Mar. 1989, pp. 57-61; J. A. Audestad: "Intelligence in Public Land Mobile Networks: Use of the Mobile Application Part" (Bordeaux, France).
Proceedings of the National Communications Forum, vol. 42, No. 2, Sep. 30, 1988, pp. 1706-1713; P. E. Jackson et al: "Portable Communication" (Oak Brook, Illinois).
Telcom Report, vol. 12, No. 5, Sep./Oct. 1989; pp. 142-145; H. Auspurg: "Intelligence Netze Beschleunigen Einfruehrung Neuer Dienste" (Munich, Federal Republic of Germany).

Primary Examiner—Salvatore Cangialosi
Attorney, Agent, or Firm—Foley & Lardner

[57] ABSTRACT

In a telephone installation, telephone rental data is loaded remotely into an independent station in the following manner.

In response to a request for a call coming from the independent station and in the presence of a load request signal, a control means searches all the telephone rental data relative to the independent station as well as that indicating an order for the remote loading. A coding means codes with the help of a special key data which is secret. A processing means authorises the transmission of non-secret pubic telephone rental data as well as secret data thus encoded to the said independant station according to the order for the remote loading.

At the independent station a decoding means deciphers the coded secret telephone rental data thus received with the help of the special key and a processing means stores the non-secret public telephone rental data thus transmitted and secret data thus decoded in a memory of the independent station.

21 Claims, 6 Drawing Sheets

TELEPHONE INSTALLATION FOR THE REMOTE LOADING OF TELEPHONE RENTAL DATA OF AN INDEPENDENT STATION

BACKGROUND OF THE INVENTION

This invention relates to the remote loading of telephone rental data of an independent station.

It can be implemented in those telecommunication systems which have mobile or fixed independent stations such as the systems called GSM 'Groupe Special Mobile', DCT 'Digital Cordless Telephone' and those systems based on radio interface CAI 'Common Air Interface', in particular the French system POINTEL (registered Trade Mark).

Generally speaking, such communication systems include at least one fixed terminal connected to a commuted telephone network and at least one independent station capable of remote intercommunication with the fixed terminal following a request for a call from the independent station.

More often than not, the personalization of an independent station is determined by the telephone rental data of the said independent station.

Whenever the request for a telephone connection is transmitted from the independent station, the telephone rental data from the independent station is regulated by an authorization center connected to the commuted telephone network and capable of blocking the creation of a telephone connection according to the said telephone rental data.

In practice, at least one part of the telephone rental data has a secret or confidential element to it for the purpose of avoiding the initiation of fraudulent telephone connections.

In the telecommunication systems which have first generation mobile independent stations, such as the systems called NMT 'Nordic Mobile Telephone', and RADIO COM 2000, the telephone rental data is loaded into the mobile independent station by a fitter or salesman of the telephonic equipment.

This method of loading presents the following problems: the adaptability and flexibility of unsatisfactory commercial supply, a confusion in the roles played by the salesman of the telephonic equipment and the benefactor of the services, and the low degree of security guarding against fraudulent connections.

In the telecommunication system which has second generation mobile independent stations, such as the GSM, it is envisaged that the telephone rental data will be programmed in a detachable rental module. This solution offers the advantage of bestowing a greater degree of security on the afore-mentioned loading method and better adaptability in the management of telephone rentals. Nevertheless, the programming of the rental data in the detachable rental module, made by means of specialised equipment, necessitates a massive substructure for the distribution of the telephone rentals.

SUMMARY OF THE INVENTION

The present invention is essentially aimed at solving this problem.

Thus, one aim of the invention is to provide a method of remote loading of telephone rental data from an independent station.

The present invention concerns a telephone installation comprising:
- at least one fixed terminal connected to a commuted telephone network;
- at least one independent station, capable of remote intercommunication with the fixed terminal following a request for a call from the said independent station, the independent station on comprising the following processing means:
  a memory capable of storing the telephone rental data relevant to the independent station and
  means for coding/decoding data; and
  authorization means connected to the fixed terminal and provided with processing means capable of monitoring the said telephone rental data for the purpose of blocking the initiation of a telephone connection.

According to a general definition of the invention, the processing means of the authorization means comprise:

a memory capable of storing, in correspondence, the telephone rental data relevant to the independent station and data capable of indicating that the said telephone rental data should be loaded remotely into the aforementioned independent station; -means for coding/decoding the variable key data, with means for allowing the selection of at least one special key for the independent station;

control means capable of searching, on request, the telephone rental data by identifying the independent station; and the arrangement of the authorization means is such that, in response to a public numerical word requesting a call, emitted from the independent station, accompanied by a public numerical word of identification from the independent station and in the presence of a load request signal verifying a predetermined condition relevant to the remote loading of telephone rental data, the control means search through all the telephone rental data relevant to the independent station as well as data indicating the order for remote loading, the coding/decoding means decipher that which is secret by using a special key the processing means authorize the open transmission of the non-secret public telephone rental data as well as the secret data, thus coded, to the said independent station as a function of the value of the data indicating the order for remote loading, whereas, the arrangement of the independent station level, is such that, the coding/decoding means decipher the secret coded telephone rental data thus received with the help of the special key, and the processing means store the non-secret public telephone rental data, thus openly transmitted, and the secret data, thus decoded, into the memory of the independent station.

Such an installation offers the advantage of not requiring the specific equipment for the programming or remote loading of telephone rental data and allows the existing substructure of the communication network to be used for the distribution and management of telephone rentals.

Moreover, the coded transmission of secret telephone rental data bestows a high degree of security on the remote loading of the said telephone rental data.

According to a preferred embodiment of the invention, the load request signal is a signal emitting from the independent station.

In practice, the request signal, emitting from the independent station, consists of entering the public numerical word for the request for a call into the keyboard of the independent station.

According to another embodiment of the present invention, the load request signal is a signal emitting from the authorization means.

According to another aspect of the invention, following the transmission of the non-secret public telephone rental data and also of the secret coded data, the processing means involved in authorization transmit to the independent station, a public numerical word for the request of authentication, accompanied by a random key-word;

In response to the numerical word for the request of authentication, the coding/decoding means of the independent station code the thus received random key-word with the help of the secret telephone rental data, thus loaded remotely and create an additional key particular to the independent station, the independent station transmits the said coded random key word to the authorization means, accompanied by the numerical word for the response of authentication, and in response to this numerical word for the response of authentication, the coding/decoding means of the authorization means decode the coded random key word thus received, compare the random key word, thus decoded, with the generated random key word and as a function of this comparison store data indicating that the telephone rental data is loaded into the independent station, as well as creating a telephone connection.

In practice, the secret telephone rental data comprises the personal identification number of the independent station.

In practice, the public telephone rental data includes the pubic numerical work for the request for a call, the numerical identification word of the operator, the numerical word relative to the class of service of the independent station and the numerical rental data.

According to another aspect to the invention, the coding/decoding means code/decode the personal identification number of the independent station as a function of variable data and their transformation by a cryptographic function F with the help of the special key and additional variable data.

According to a variant of the invention in which the independent station is capable of remote intercommunication with an auxiliary commuted telephone network whose auxiliary authorization means are connected to the authorization means for the purpose of allowing exchange of data between the said authorization means, in that the processing means of the auxiliary means of authorization comprise;

a memory capable of storing the provisional telephone rental data relevant to the independent station; and control means capable of generating the provisional telephone rental data for the independent station; the arrangement of the authorization means is further such that in response to a public numerical word for the request for a connection with the auxiliary telephone network emitting from the auxiliary means of authorization, the processing means generate the variable data and calculate their transformation with the help of a special key formed from secret telephone rental data when the public numerical word for the request for a connection verifies a predetermined condition relative to the authentication of the independent station by the authorization means, the processing means transmit the variable data and their transformation, thus calculated, to the auxiliary authorization means;

the arrangement of the auxiliary authorization means is such that, the control means generate the provisional public telephone rental data, the control means generate the provisional, secret telephone rental data and code them with the help of variables and their transformation thus received, the processing means transmit the provisional secret telephone rental data, thus coded, to the independent station accompanied by the said provisional public telephone rental data thus generated; and the arrangement of the independent station is such that, the coding/decoding means decipher the coded provisional secret telephone rental data, thus received, with the help of the special key formed by secret telephone rental data and the processing means store the provisional non-secret public telephone rental data, thus openly received, and the secret data, thus decoded, in the memory.

Such an installation offers the advantage of allowing the generation of secret telephone rental data at the level of auxiliary authorization means without prior transmission of the secret telephone rental data between the authorization means and the auxiliary authorization means, which bestows a high degree of security on the remote loading of the said provisional telephone rental data.

In practice, the secret provisional telephone rental data comprises the provisional personal identification number of the independent station.

In practice, the public provisional telephone rental data comprises the public numerical word for the request for a call, the numerical identification word for the operator, the numerical word relative to the class of service of the independent station and the numerical rental data.

According to another aspect of the invention the coding/decoding means code/decode the provisional personal identification number of the independent station as a function of the variable data and their transformation by a cryptographic function F with the help of the special key.

Advantageously, the coding/decoding means code/decode the provisional personal identification number of the independent station as a function of the variable data, their transformation by a cryptographic function F with the help of the special key and of additional variable data generated by the control means of the auxiliary authorization means.

According to another characteristic of the invention, the authorization means or the auxiliary authorization means correspond to a general authorization centre working for all the independent stations and all the fixed terminals of the commuted network or of the auxiliary commuted network.

According to another characteristic of the invention, the authorization means or the auxiliary authorization means are housed in the fixed terminal and are connected to a general authorization centre for all the independent stations and fixed terminals of the commuted network.

The invention also involves a method for the remote loading of telephone rental data intended for use in a telephone installation.

According to the method of the invention, it is proposed to equip the processing means of the authorization mean with:

a memory capable of storing, in correspondence, telephone rental data relevant to the independent station and data capable of indicating that the said telephone rental data has to be loaded remotely into the said independent station;

means for coding/decoding means variable key data with means allowing the selection of at least one special key for the independent station;

control means capable of searching on request telephone rental data by identifying the independent station and the method consists of the following steps:

a) at the authorization means, a1) in response to a public numerical word for the request of a call emitting from the independent station, accompanied by a public numerical word for identification from the independent station and in the presence of a control signal, verifying a predetermined condition relative to the remote loading of telephone rental data, to search all the telephone rental data relevant to the independent station as well as that indicating the order for remote loading, a2) to code with the help of the special key data which is secret.

a3) to authorise the open transmission of the non-secret public telephone rental data as well as secret data, thus coded, to the said independent station according to the value of the data indicating the order of long distance loading, b) at the independent station, b1) to decode the secret telephone rental data, thus received, with the help of the special key, b2) to store the non-secret public rental data, thus transmitted, and the secret data, thus decoded, in the memory of the independent station.

According to a particularly interesting variant of the invention, the method of remote loading of telephone rental data, according to the invention, can also be applied to a telephone installation in which the independent station is capable of remote intercommunication with an auxiliary commuted telephone network whose auxiliary authorization means are connected to the authorization means for the purpose of allowing the exchange of data between the said authorization means.

In this variant of the method, it is envisaged that the processing means of the auxiliary authorization means be equipped with:

a memory capable of storing the provisional telephone rental data relative to the independent station;

control means capable of generating the provisional telephone rental data for the independent station; and the method comprises the following steps:

1) at the authorization means, 11) in response to a public numerical word for the request of a connection with the auxiliary telephone network emitting from the auxiliary authorization means, to generate the variable data, calculate their transformation with the help of a special key formed by secret telephone rental data when the public numerical word for the request for connection verifies a predetermined condition relative to the authentification of the independent station by the means of authorization, 12) to transmit the variable data and their transformation, thus calculated, to the auxiliary authorization means, 2) at the auxiliary authorization means, 21) to generate the provisional public telephone rental data, 22) to generate the provisional secret telephone rental data and code it with the help of variable data and their transformation, 23) to transmit the provisional secret telephone rental data, thus coded, to the independent station, accompanied by the said public provisional telephone rental data, thus generated, 3) at the independent station, 31) to decode the coded provisional secret telephone rental data, thus received, with the help of the special key formed by secret telephone rental data, and 32) to store the provisional open public telephone rental data thus received, and secret data thus decoded, in the memory.

Advantageously, stage 22 consists moreover of the following steps:

*221) to generate additional variable data and code the telephone rental data moreover with the help of the said Complementary variable data.

Other features and advantages of the invention will become apparent from the following detailed description, and the associated drawings.

DETAILED DESCRIPTION OF THE PREFERRED EMBODIMENT

Figure 1:
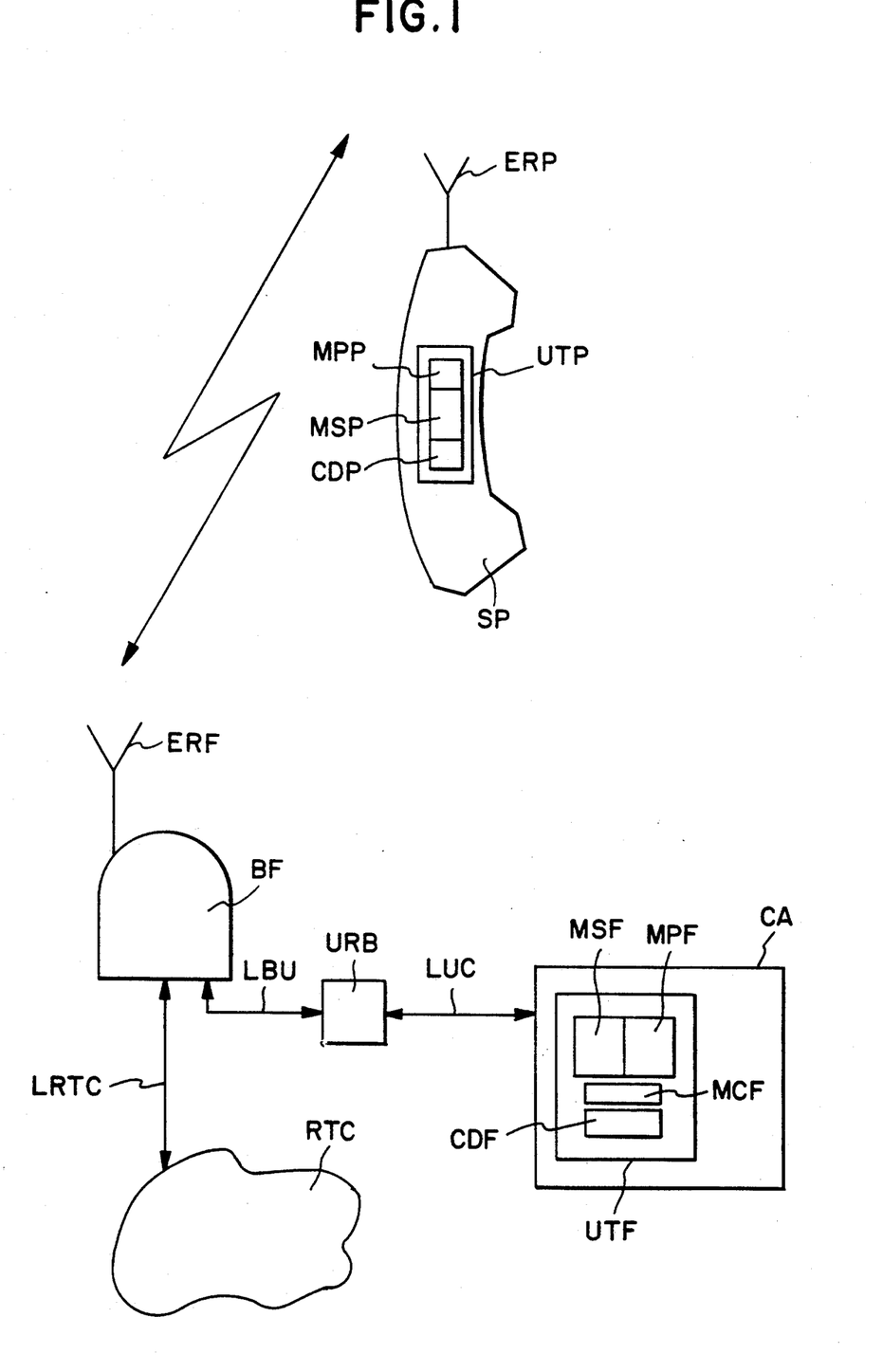
FIG. 1 shows schematically a telephone installation according to the invention.

FIG. 1 shows diagrammatically a telephone installation intended for use in a telecommunication network of the type POINTEL (registered Trade Mark) subjected to the anglo-saxon standard CAI 'Common Air Interface', bearing the reference MPT1375.

The independent station SP which can be mobile or fixed, is capable of remote intercommunication with a fixed terminal BF, following a request for a call from the independent station SP. The independent station SP is equipped with an assembly ERP comprising a transmitter/receptor and an antenna.

For its part, the fixed terminal BF is equipped with an assembly ERF comprising a transmitter/receptor and an antenna for remote intercommunication between the fixed terminal and the independent station.

The CAI standard provides that the radio transmission medium between the independent station and the fixed terminal is made up of telephone channels (B) and numeric signal channels D.

The fixed terminal is connected to a commuted telephone network LRTC. The CAI standard provides also that the independent station has processing means UTP, comprising:

a memory subdivided into a public memory zone MPP intended to store public telephone rental data from the independent station and into a secret memory zone MSP intended to store the secret telephone rental data from the said station; and means for coding/decoding CDP data.

It should be noted here that the subdivision of the memory of the independent station into a protected zone and a non-protected zone is beneficial for bestowing an additional degree of security. However, this subdivision is not indispensable for the implementation of the invention.

The installation is completed by the authorization means CA connected to the fixed terminal via a terminal connection unit URB. A specialised telephone connection LBU allows the link of the terminal connection unit URB to the fixed terminal BF, whereas a numerical signalization line (LUC) allows the link between the authorization means CA and the terminal connection unit URB.

The authorization means CA consist of the processing means UTP equipped with a memory capable of holding the telephone rental data from an independent station and allowing the control of the telephone rental data for the purpose of blocking the formation of a telephone connection between the fixed terminal and the independent station.

Advantageously, the memory of the of the authorization means is subdivided into a public memory zone MPF capable of storing the public telephone rental data from the independent station and into a secret memory zone MSF capable of storing the secret telephone rental data of the said independent station. Of course this subdivision is not indispensable for the implementation of the invention.

It should be noted here that the authorization means CA correspond to a general authorization centre for all the independent stations and fixed terminals of the commuted network RTC.

It should also be noted here that there exist telecommunication systems with independent stations in which the authorization means are housed in at least one fixed terminal and are connected to a general authorization centre for all the independent stations and fixed terminals from the commuted network RTC.

In the remainder of the description, only the telecommunication systems in which the authorization means correspond to a general authorization centre of the commuted network will be considered. However, the essential component means of the invention also apply to the authorization means housed in the fixed terminal.

The telephone rental data from POINTEL (a registered Trade Mark) is allocated to their clients by a POINTEL contractor at the time of rental purchase. This data is necessary at the independent station to allow the client access to POINTEL services.

According to the CAI standard the telephone rental data comprise of the following:

the public numerical word for the request of a call LID ('Link Identification Data') corresponding to the first packet of bits to be sent to a fixed terminal to establish a radio connection, whose size is 16 bits;

the numerical word relative to the secret identification number of the independent station PIN ('Personal Identification Number'), whose size is 64 bits;

the numerical word of identification for the operation OPSIC ('Operators Identity Code'), whose size is 9 bits;

the numerical word TCOS ('Telecom Class of Service'), relative to the class of service of the independent station and whose size is 3 bits; and the numerical data TRD ('Telepoint Registration Data'), relative to the additional telephone rental data intended solely to identify the rental of an independent station, whose size is 80 bits maximum.

The CAI standard renders the numerical words LID, PIN, OPSIC, and TCOS obligatory for the creation of a radio telephone connection. The CAI standard also defines the size of these words. On the other hand the word TRD is left to the discretion of the operator, it is coded in decimal for example.

On the other hand the word OPSIC identifies the POINTEL contractor with whom rental has been subscribed.

Generally speaking, the telephone rental data, after allocation, is used at a time of POINTEL calls to authenticate the independent station before providing the requested service.

At the moment the CAI standard provides a manual loading of telephone rental data of the independent station by the fitter or salesman of telephonic equipment.

Now, such a method of telephone rental data loading is unsatisfactory to the extent that it demands a manual intervention from the salesman of the telephonic equipment or from the subscriber and presents a low degree of security against fraudulent rentals.

The Applicant is faced with the problem of providing a method of remote loading of telephone rental data which allows the aforementioned disadvantages to be remedied without having to modify the substructure of a telephone installation of type POINTEL.

Figure 2:
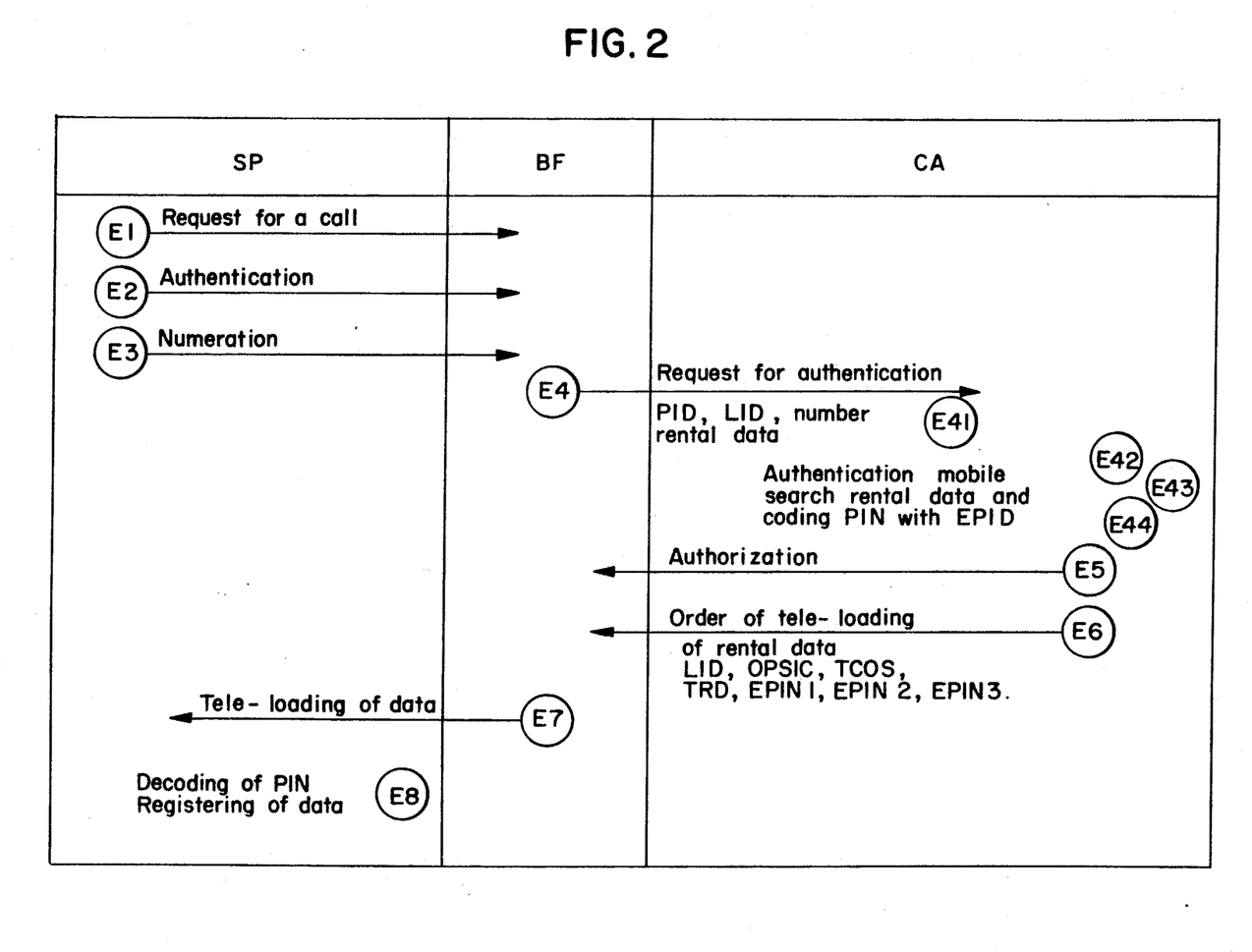
FIG. 2 is a diagram illustrating the protocol relative to the remote loading of telephone rental data according to the invention.
Figure 3:
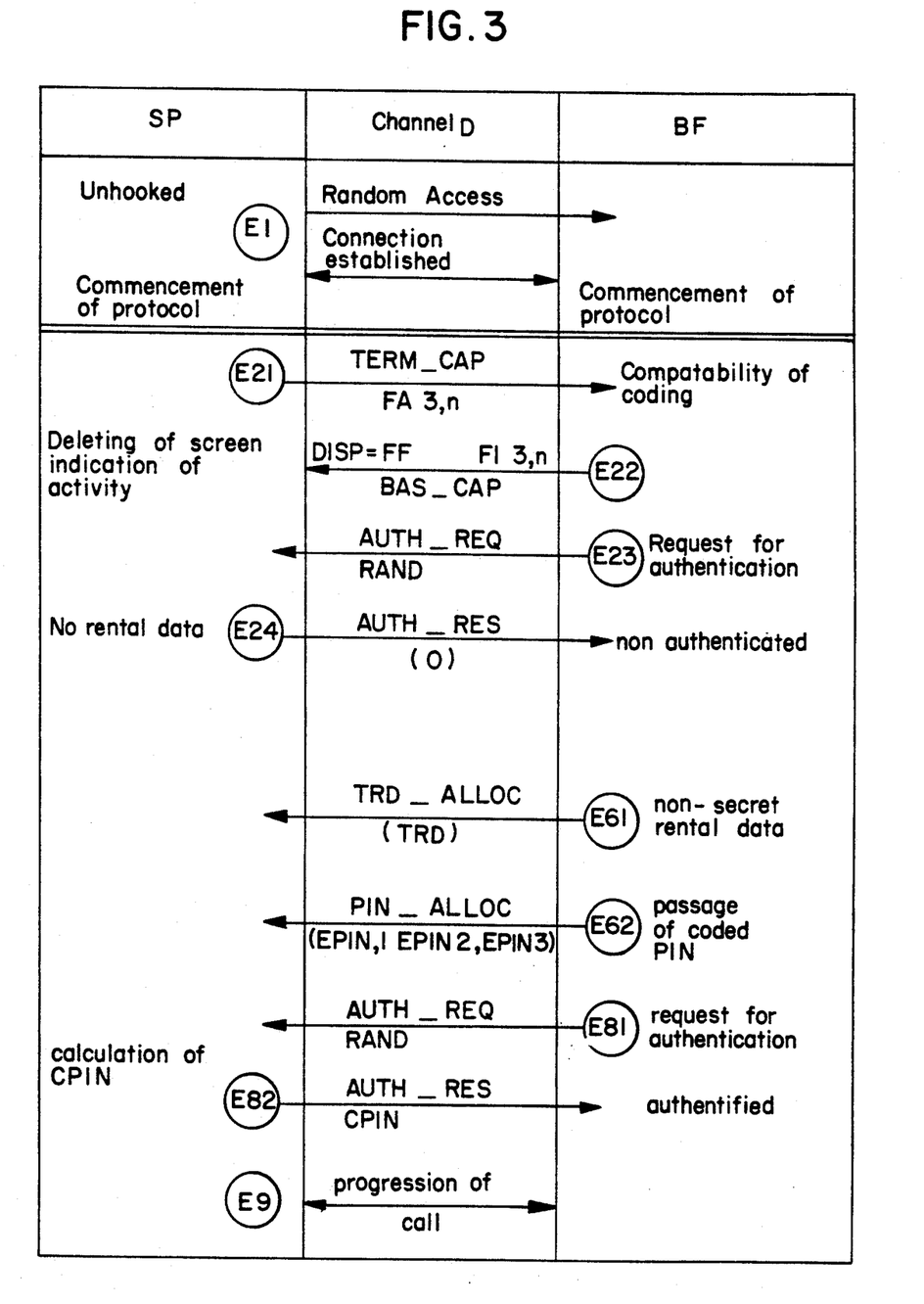
FIG. 3 illustrates diagrammatically the data exchange between the independent station and the fixed terminal according to the invention.

FIGS. 2 and 3 show diagrammatically the essential and component stages of the protocol of the remote loading of telephone rental data according to the invention.

The protocol of remote loading is initialised by the E1 stage, relative to the request for a call emitting from the independent station.

The E1 stage commences with the unhooking of the receiver at the independent station with the aim of establishing a radio connection with the fixed terminal BF. Access is random and is achieved via one of the forty channels allocated by the CAI standard. The radio connection is established with the fixed terminal BF when the public numerical word for the request of a call LID is accepted by the commuted telephone network.

In stage E2, the independent station exchanges complementary messages with the fixed terminal which allows authentication of the independent station.

More precisely, the independent station emits the message relative to the capabilities of the independent station TERM_CAP ('Terminal Capabilities Information Element') accompanied by the message relative to the activity of the independent station FA3,n ('Feature Activation Information Element'). The messages TERM_CAP and FA3,n allow the independent station to present itself before the fixed terminal (stage E21).

In response to the messages TERM_CAP and FA3,n, the fixed terminal sends messages DISP=FF relative to the delete order on the screen of the independent station and F13,n, relative to acceptance of the requested service (here by FA3,n), subject to subsequent authorization being verified (stages E23 and E24).

For the rest, the fixed terminal BF emits the message BAS_CAP ('Base Capabilities Information Element'), relative to the telephonic capabilities of the independent station, authenticated by the fixed terminal.

At the time of the E23 stage, the fixed terminal generates a random key word RAND and transmits the random key word RAND to the independent station accompanied by a public numerical word for request of authentication AUTH_REQ.

In response to the numerical word for the request of

In response to the numerical word for the request of authentication AUTH_REQ, the coding/decoding CDP means of the independent station, code the random key word RAND thus received with the help of a special key for the independent station. For example the special key is created by the secret telephone rental data relative to the independent station, notably its Personal Identification Number 'PIN'.

Next, the independent station sends the random key word CPIN thus coded to the fixed terminal BF accompanied by a public numerical word for the response of authentication AUTH_RES. The independent station is considered as being non-authentic when the coding of the random word is nul which results from the absence of secret PIN telephone rental data in the memory of the independent station.

On the other hand, when the secret PIN telephone rental data is available in the memory of the independent station, stage E2, relative to the authentication of the independent station will be positive and will result in the creation of a telephone connection being authorised.

More precisely, in response to the numerical word for response of authentication AUTH-RES, the coding/decoding CDF means from the centre of authorization decipher the random key word coded CPIN thus received with the help of the special key PIN, compare the random key word thus decoded with that generated by the fixed terminal and authorise the creation of the telephone connection according to the comparison.

Stage E3 consists of the numeration of the call from the keyboard of the independent station.

It is to be noted here that the three stages E1 to E3 are already present in the current standard CAI.

According to the invention, following stage E3, a stage E4 is foreseen, developing as follows;

First of all the of authorization centre receives identification from the fixed terminal of the independent station, wanting to bring about a first call. This identification involves the sending of the messages made up of the words PID, TCOS,OPSIC,TRD, and LID. Next, the authorization centre determines the service sought by means of the words LID,FA3,, and of the desired telephone number in the case of a telephone call (stage 41).

It is according to the numerical word for the request of a call LID that the authorization centre decides whether or not to reply to the request for a call emitting from the independent station.

Very advantageously it is arranged, according to the invention, to differentiate the LID when it concerns a request for a call accompanied by a request for the remote loading of telephone rental data.

For example, it is envisaged that when one wants a long distance loading of telephone rental data, the particular LID for long distance loading of telephone rental data will be entered into the keyboard (manual generation of LID).

It should be noted here that the CAI standard provides that the LID extends to four figures, made up of between 0 and 7, that is to say, between 0000 and 03EF in hexadecimals.

According to the invention it is moreover envisaged that data indicating that the telephone rental data should be loaded remotely into the independent station, should be stored in the memory of the processing means of the authorization centre.

First of all, in response to a request for a call LID emitting from the independent station accompanied by an identification from the independent station PID and in the presence of a load request signal verifying a predetermined condition relative to the remotee loading of the telephone rental data (here manual generation of LID), the control means search through all the telephone rental data relative to the independent station as well as that indicating the order of remote loading (stage E43).

Next, the coding/decoding means CDF code the secret telephone rental data with the help of a special key (stage E44).

Finally, the processing means, UTF, authorise the transmission of the non-secret public telephone rental data as well as that secret data, thus coded, to the said independent station SP as a function of the value of the data indicating the order for the remote loading (stage E6).

On the contrary, when the public numerical word for the request for a call LID is automatically generated that indicates that the independent station either does not request the telephone rental data or is already personalised.

According to the result of a verification of authentication from the independent station, the processing means from the authorization centre either authorise the creation of the telephone connection or do not follow up the request for a call from the independent station (stage E5).

More precisely, the request for Verification of authentication develops in the following manner:

In response to the numerical word for the request of authentication AUTH_RES, the coding/decoding means, CDF, of the authorization centre decode the random key word, coded CPIN, thus received with the help of the special key, PIN, compare the random key word, thus decoded, with the one generated and authorise the creation of the telephone connection as a function of the comparison.

Stage E6 comes into play when the value of the data, representative of an order for tele-loading, indicates that the independent station should be loaded remotely.

Very advantageously the transmission of the telephone rental data splits into two divisions—one concerning the public telephone rental data and the other concerning the secret telephone rental data.

At the time of stage E61, the transmission of the numerical word TRD_ALLOC allows the transmission of the public telephone rental data TRD.

For its part, the secret telephone rental data is transmitted by means of a numerical word PIN_ALLOC.

According to the invention, the secret telephone rental data is transmitted in code to avoid fraudulent interception of the said secret data.

According to the invention, the coding of the secret telephone rental data is achieved by the coding/decoding means of data from the authorization centre with means allowing the selection of a special key for the said independent station.

Figure 4:
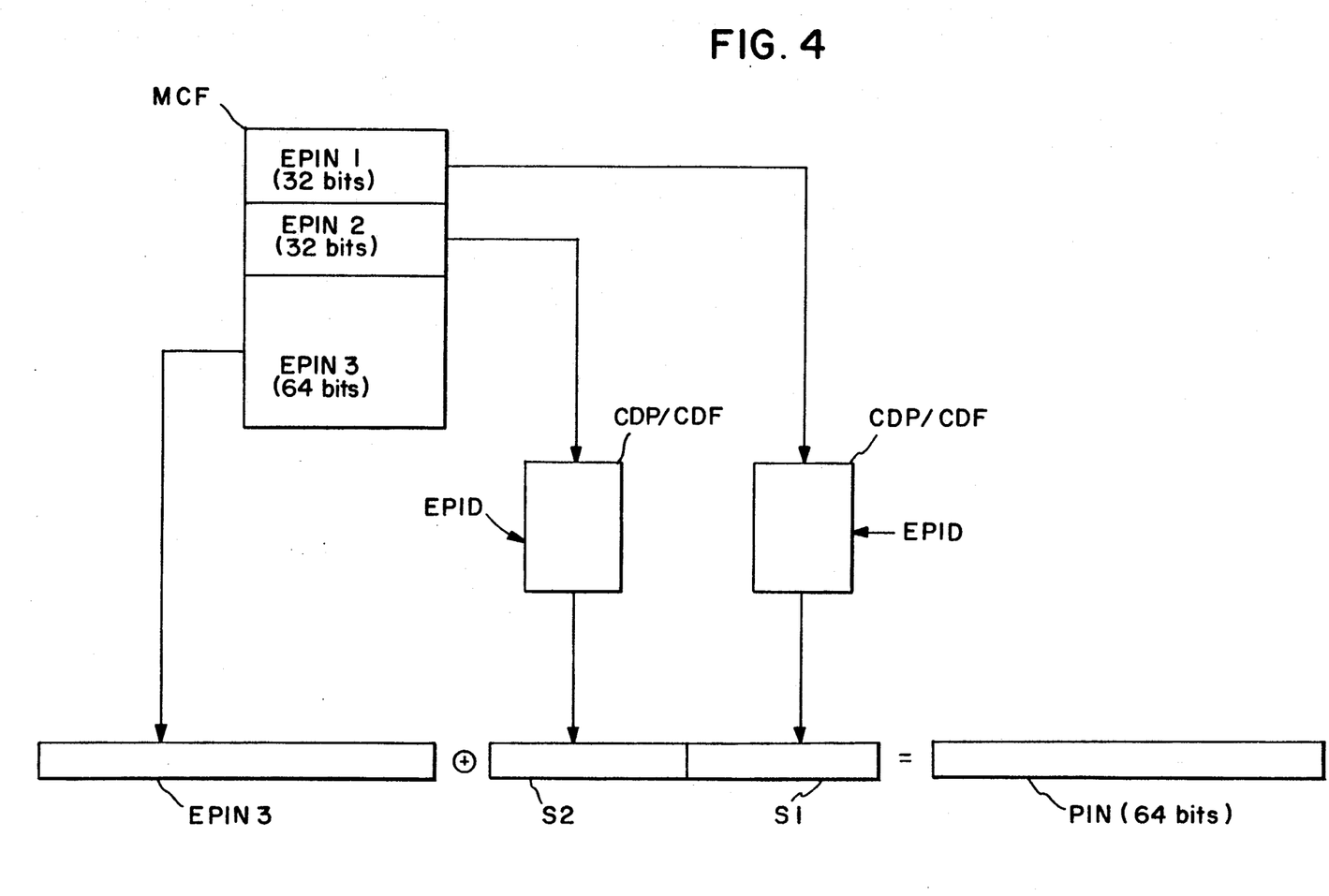
FIG. 4 illustrates diagrammatically the coding/decoding of secret telephone rental data.

Reference is now made to FIG. 4.

Here, the special secret key used for the coding of secret telephone rental data is the key EPID ('Encrypted Portable Identification Data').

Of course, this special key EPID for the independent station is housed, at the same time, in the independent station SP and in the centre of authorization CA.

In practice, the control means from the authorization centre generate primarily from the first and second random numbers EPIN1 and EPIN2, possessing a respective size of 32 bits.

Next, the coding/decoding means CDF of the authorization centre calculate the respective transformations S1 and S2 of the said first and second random numbers EPIN1 and EPIN2 by a cryptographic function F with the help of the secret key EPID.

Finally, the control means generate the personal identification number PIN (representative of the secret telephone rental data) with the help of the sum of the transformation S1 and of the product of transformation S2 by $2^{32}$, which allows a PIN out of 64 bits to be obtained.

If the case arises, the control means generate the PIN with the additional help of a complimentary variable data EPIN3, worth 64 bits, also generated by the control means and completing the preceding calculation according to an EXCLUSIVE or sum.

Thus it is the transmission of the variable words EPIN1, EPIN2, and EPIN3 (if the case arises) which allows remote loading, in a coded manner, of the secret telephone rental data.

With the reception of these words, EPIN1, EPIN2 and EPIN3 (if the case arises), the coding/decoding means from the independent station calculate first of all the respective transformations S1 and S2 of the words EPIN1 and EPIN2 by the cryptographic function F with the help of the secret key EPID. Finally, they bring about a calculation for recovering the secret rental data PIN with the help of S1 and S2 and EPIN3 (if the case arises).

Advantageously, to verify that the secret and public telephone rental data have been correctly loaded at remotely in the independent stations, a stage for the request for authentication, stage E81, identical to the stage described earlier E23, may be provided; in other words it involves the sending of a numerical word for the request of authentication, AUTH_REQ, to the independent station accompanied by a random number RAND.

In response to the numerical word for the request of authentication, AUTH_REQ, the coding/decoding means, CDP, of the independent station code the random key word RAND just received, with the help of the secret telephone rental data PIN relative to the independent station and previously transmitted in code by the intermediary of the words EPIN1, EPIN2 and EPIN3 and decoded by the intermediary of the key EPID.

Then, the independent station SP sends the random key word thus coded CPIN to the authorization centre CA, accompanied by the numerical word for the response of authentication AUTH_RES. In response to the said numerical word for response of authentication AUTH_RES, the coding/decoding means of the authorization centre decode the coded random key word CPIN thus received with the help of the special key PIN. Finally, the authorization centre compares the random key word thus decoded with the random key word thus generated (stage E82) and thus establishes the telephone connection according to the comparison (stage E9).

In practice, it is envisaged that one public numerical word USE out of eight is intended to indicate the nature of the data. For example, the first bit of the octet concerns the coding of the data (0 for non-coded, 1 for coded). The second bit of the octet concerns the nature of the rental (0 for main, 1 for auxiliary, in other words for a ROAMING service, which will be described later in greater detail). The other bits are held at zero for storage of the data in the respective memories of the independent station.

It should be noted that it is the word USE which indicates to the independent station the use that it should make of the public numerical word PIN_ALLOC.

One numerical word out of the octet is also envisaged, AUTH_NO, whose function is to indicate to the independent station which of its cryptographic functions it should use to code/decode the data. If the independent station only has one cryptographic function available, the word AUTH_NO has no effect.

In the embodiment described previously, it is a word for the request for a call LID, coming from the independent station, received at the keyboard, which allows the commencement of loading of public and secret telephone rental data via the messages PIN_ALLOC and TRD_ALLOC.

In this example, a word LID, generated automatically by the independent station when the receiver is unhooked, does not allow the remote loading of the said telephone rental data.

The result is that the telephone rental data is only transmitted remotely if the user of the independent station wishes it so (that is to say here by the reception of the LID at the keyboard).

For special applications such as the modification of at least one part of the telephone rental data, without the independent station (or its subscriber) affecting any control or requiring any particular service, the load request signal setting off the method of remote loading can be a load request coming from the authorization means.

According to another embodiment of the invention, the remote loading method of the telephone rental data is also applied to a service called ROAMING (that is to say a request for a call to an auxiliary telephone network for which the independent station does not have subscription) amongst several POINTEL contractors.

Generally speaking, the ROAMING service allows a subscriber of an independent station, having subscribed to a special rental with a POINTEL contractor, to use to a certain extent the auxiliary commuted network of another POINTEL contractor. It should be noticed here that the ROAMING service is only possible when all the public and secret data relevant to the independent station is available at the same time at the independent station level and at the authorization centre level.

On the other hand, the auxiliary authorization centre managing the auxiliary commuted network does not posses the telephone rental data of the said independent station to avoid fraudulent connections.

Up till now, when the subscriber of an independent station establishes a connection with an auxiliary small holder the auxiliary centre of authorization demands a couple of standard authentications from the authorization centre, constituted by a random word and its transformation by a secret key which is generally formed by the secret telephone rental data of an independent station, for example, the personal identification number PIN. This couple of authentications thus allows the authentication of the independent station at the auxiliary centre level.

However, the authentication of the independent station by this method of authentification is not very satisfactory for the following reasons.

On the one hand, the exchanges between the memories forming the data base for each authorization centre run up high costs to the extent that they are relatively long and systematic at the time of each call.

On the other hand, this method of authentication is not appropriate to commuted telephone networks in which it is the fixed terminal which possesses a memory forming the data base to confirm the authentication of the independent stations.

The Applicant is faced with the problem of providing a method of long distance loading of telephone rental data in a ROAMING service allowing the disadvantages mentioned above to be overcome.

According to the invention, the principal consisting of transmitting the secret PIN coded telephone rental data conforming to the invention described in reference to FIGS. 1 and 4, is applied for the transmission of provisional secret telephone rental data from the main authorization centre to the auxiliary authorization centre necessary for the auxiliary authorization centre to authorise the telephone connection between the independent station and the auxiliary commuted telephone network.

Thus, the provisional telephone rental data is coded before transmission with the help of a special key for the independent station. It is advantageous that the special key is formed from the secret PIN of the telephone rental data, which is housed simultaneously in the independent station and in the main authorization centre.

Figure 5:
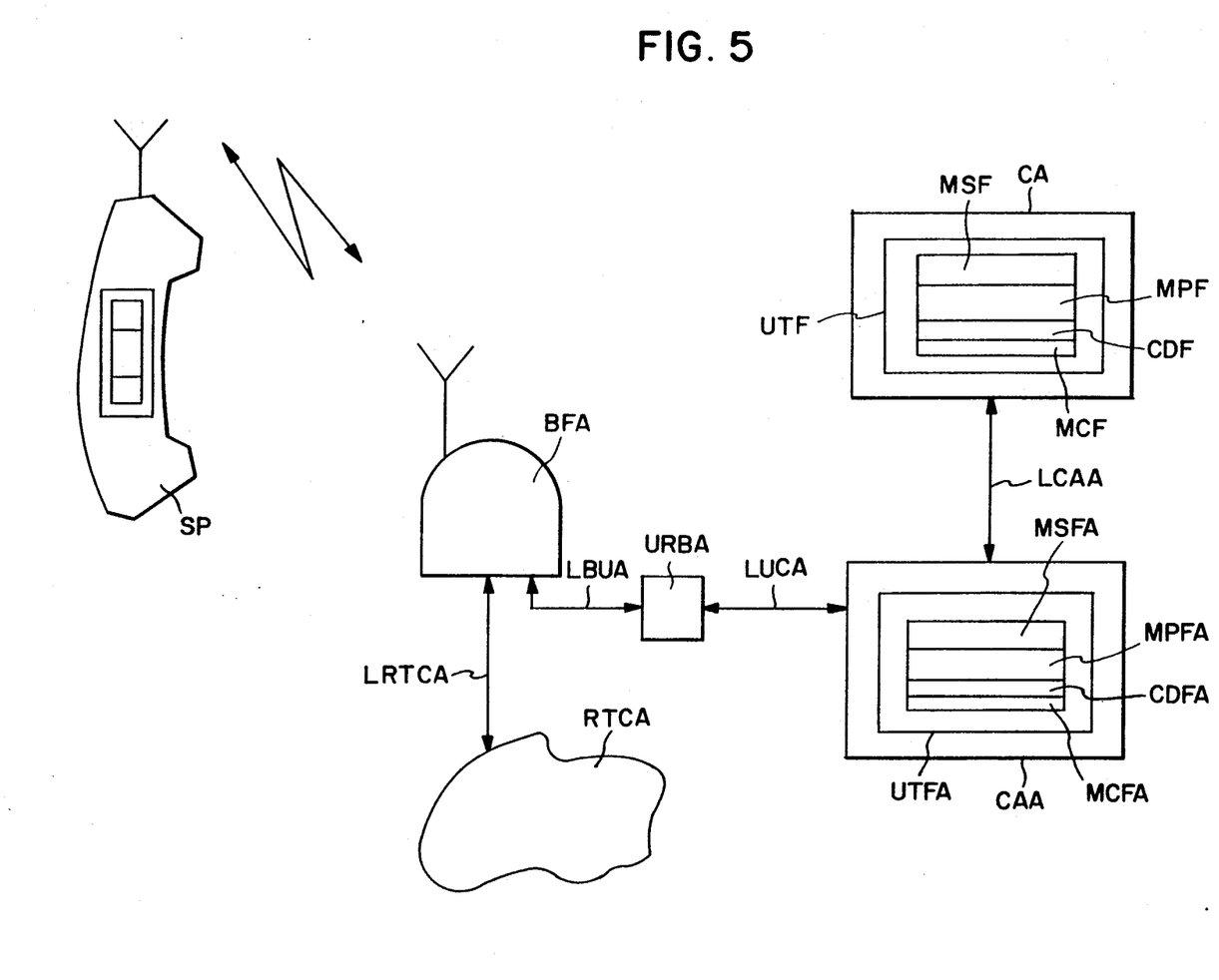
FIG. 5 is a diagram of a telephone installation in which the independent station interacts with an auxiliary commuted telephone network according to the invention.

In FIG. 5, a telephone installation has been schematically shown in which the independent station is in telephonic intercommunication with an auxiliary commuted telephone network for which the independent station does not possess telephone rental data (a so called ROAMING service).

The independent station SP is capable of remote intercommunication with an auxiliary telephone installation whose essential and constituent components are identical to those of the telephone installation described with reference to FIG. 1 and bearing the same references accompanied by a suffix A.

The main authorization centre CA is joined to the auxiliary authorization centre CAA via a numerical signal connection LCAA.

In a ROAMING service, the remote loading of telephone rental data is only possible if the main authorization centre CA is connected to the auxiliary authorization centre CAA via a numerical signal connection LCAA.

It should be noted that the remote loading of telephone rental data is only possible here if the auxiliary authorization centre works in harmony with the main centre of authorization.

Figure 6:
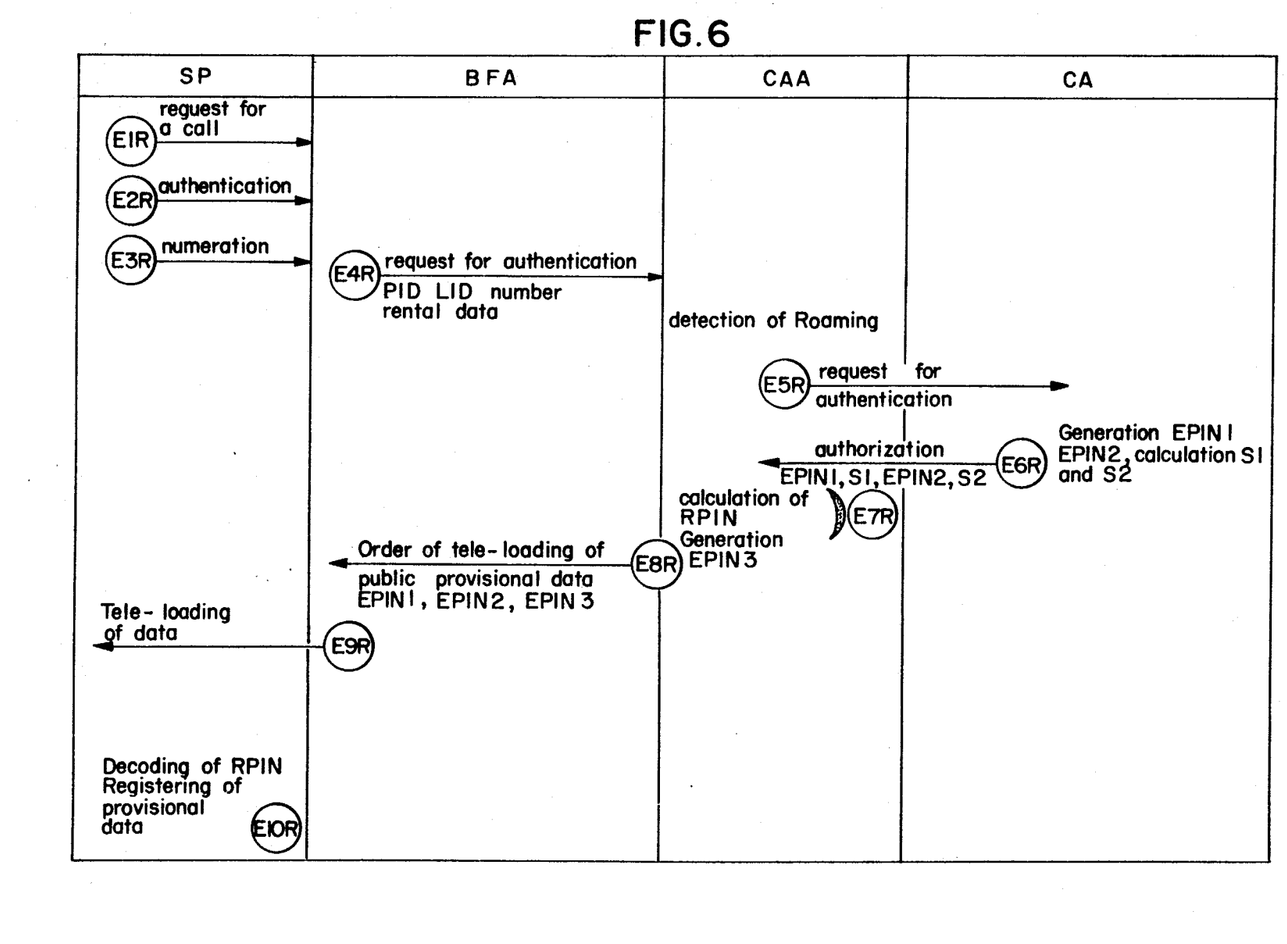
FIG. 6 is a diagram illustrating the protocol relative to the remote loading of telephone rental data in an installation according to FIG. 5.

In FIG. 6 the essential component steps of a protocol of remote loading of provisional secret telephone rental data in the framework of a ROAMING service have been shown schematically The beginning of the protocol of remote loading in the framework of a ROAMING service, here made up of the stages E1R, E2R and E3R, is identical to the beginning of the protocol described in reference to FIG. 3 (stages E1,E2 and E3). It only differs in the activation of the ROAMING keyboard which encloses the format of the telephone call number.

After the request for a call comes from the independent station (stages E1R, E2R, and E3R), the fixed terminal lodges a request for authentication (stage E4R) with the auxiliary authorization centre CAA, for the purpose of establishing a telephone communication with the auxiliary commuted network, managed by the said auxiliary authorization centre.

The request for authorization to establish the telephone communication relative to the E4 stage is identical to the request for authentication described with reference to FIG. 3 (stage E4R). It only differs in the addition of the ROAMING information.

Once the auxiliary authorization centre has discovered that it is a matter of an auxiliary request for authentication, the said auxiliary authorization centre lodges a request for authentication (stage E5R) intended to ask for authorization from the main authorization centre for the creation of a telephone connection between the independent station and the auxiliary commuted telephone network.

In response to the request for authentication (stage E5R) coming from the auxiliary authorization centre, the control means from the authorization centre, primarily generate the first and second random numbers EPIN1 and EPIN2, possessing a respective worth of 32 bits.

Next, the coding/decoding means CDF of the authorization centre calculate the respective transformations S1 and S2 of the said first and second random numbers EPIN1 and EPIN2 by a cryptographic function F with the help of the secret PIN key (representative of the secret telephone rental data of the independent station housed in the memory of the independent station for its functioning (for example resident through teleloading according to the method in accordance with the invention).

Finally, the processing means of the authorization centre authorise the transmission of variable data EPIN1 and EPIN2 as well as their transformations S1 and S2 to the auxiliary authorization centre when the public numerical word for the request of a call verifies a predetermined condition relative to the authentication of the independent station (stage E6R).

Following the transmission of the data EPIN1 and EPIN2, S1 and S2, the control means MCFA of the auxiliary authorization centre generate the public provisional telephone rental data and transmit them to the independent station via the auxiliary fixed terminal BFA (Stage E8R).

Moreover, the control means MCFA generate the personal identification number RPIN (representative of the secret provisional telephone rental data) with the help of the sum of the S1 transformation and of the product of the S2 transformation by $2^{32}$, which allows a RPIN of 64 bits to be obtained (stage E7R).

If the case arises, the control means MCFA generate the RPIN with the additional help of a complementary variable data EPIN, with a worth of 64 bits generated also by the control means and completing the preceding calculation according to an EXCLUSIVE or sum.

Thus, on the one hand it is the transmission of the variable words EPIN1 and EPIN2 and of their transformations S1 and S2 which allows the secret provisional data to be generated at the auxiliary authorization means level. On the other hand, it is the transmission of variable words EPIN1, EPIN2 and EPIN3 (if the case arises) between the auxiliary means and the independent station which allows the remote loading of secret provisional telephone rental data.

With the reception of the words EPIN1, EPIN2 and EPIN3 (if the case arises) the coding/decoding means of the independent station calculate firstly the respective transformations S1 and S2 of the words EPIN1 and EPIN2 by the cryptographic function F with the help of the secret key PIN. Finally, they result in a calculation for recuperating the secret provisional telephone rental data RPIN (stages E9R, E10R).

Finally, the non-secret provisional public telephone rental data thus received and the secret data thus decoded, are stored in their respective memories (stage E10R).

After stage E6, the auxiliary authorization centre possesses the provisional secret telephone rental data RPIN allowing the authentication of the independent station. The result is that the systematic interrogation of the auxiliary authorization centre with the main authorization centre to permit the formation of a telephone connection is no longer necessary.

As for the rest, the stages relative to the authentication of the independent station with the auxiliary authorization centre are identical to the stages relative to the authentication of an independent station with the main authorization centre. They only differ in the generation of provisional public telephone rental data on the auxiliary centre of authorization level.

In the case where the auxiliary authorization means are housed in the fixed terminal and are connected to a general auxiliary authorization centre, it can be envisaged according to the invention, that the said fixed terminal be fitted with means allowing it to interrogate the general auxiliary authorization centre, for the purpose of receiving data EPIN1, EPIN2, S1 and S2, allowing the generation of secret provisional telephone rental data at the auxiliary authorization level.

What is claimed is;
1. A telephone installation comprising:
   a fixed terminal connected to a commuted telephone network;
   an independent station for remote intercommunication with said fixed terminal following a call request from said independent station, said independent station comprising station processing means having a memory to store telephone rental data relative to said independent station and means for coding/decoding data;
   an authorization means connected to said fixed terminal and having authorization processing means for monitoring said telephone rental data for the purpose of blocking the formation of a telephone connection, said authorization processing means including:
   (i) a memory for holding in correspondence, said telephone rental data relative to said independent station and data for indicating that said telephone rental data must be loaded remotely into said independent station;
   (ii) means for coding/decoding variable key data, with means allowing for selection of at least one designating key for said independent station; and
   (iii) control means for searching on request said telephone rental data by identifying said independent station, wherein in said authorization means,
   in response to a public numerical word for a call request coming from said independent station accompanied by a public numerical word for identification of said independent station, and in the presence of a load request signal verifying a predetermined condition relative to remote loading of said telephone rental data, said control means searches all said telephone rental data relative to said independent station as well as data indicating an order for remote loading,
   said means for coding/decoding variable key data codes said designating key data that is secret, and
   said authorization processing means authorizes transmission of public said telephone rental data as well as secret said telephone rental data, thus coded, to said independent station according to said data indicating an order of remote loading, and
   wherein in said independent station,
   said means for coding/decoding deciphers received coded said secret telephone rental data using said designating key and,
   said processing means stores received public said telephone rental data and secret said telephone rental data thus decoded in said independent station.

2. The apparatus recited in claim 1, wherein said load request signal is a signal from said independent station.

3. The apparatus recited in claim 2, wherein said load request signal coming from said independent station is generated when said public numerical word for said call request is entered into a keyboard of said independent station.

4. The apparatus recited in claim 1, wherein said load request signal is a signal from said authorization means.

5. The apparatus recited in claim 1, wherein said authorization processing means is configured to deliver to said independent station a public numerical word to request authentication accompanied by a random key word following transmission of public said telephone rental data and coded secret said telephone rental data and, in response to said numerical word to request authentication, said coding/decoding means of said independent station is configured to code said random key word thus received using said secret telephone rental data thus loaded remotely and to create an additional designating key for said independent station, and wherein
   said independent station is configured to transmit said coded random key word to said authorization means accompanied by a numerical word as an authentication response, and wherein,
   in response to said numerical word as an authentication response the coding/decoding means of the authorization means is configured to decipher said coded random key word thus received, to compare said random key word thus decoded with said random key word generated, and, according to the comparison, to store data indicating that the telephone rental data is loaded into the independent station as well as to create a telephone connection.

6. The apparatus recited in claim 1, wherein said secret telephone rental data comprises a personal identification number of said independent station.

7. The apparatus recited in claim 1, wherein said public telephone rental data comprises a public numerical word for the request for a call, a numerical word for identification of a class of service of said independent station and numerical data for rental.

8. The apparatus recited in claim 6, wherein said coding/decoding means codes/decodes a personal identification number of said independent station according to variable data and transformations thereof by a cryptographic function using said designating key.

9. The apparatus recited in claim 6, wherein said coding/decoding means codes/decodes a personal identification number of said independent station as a function of variable data and transformations thereof by means of a cryptographic function using said designating key and by means of additional variable data.

10. The apparatus recited in claim 1, wherein said independent station is for remote intercommunication with an auxiliary commuted telephone network having auxiliary authorization means connected to the said authorization means for the purpose of allowing an exchange of data with said authorization means and wherein said auxiliary authorization means comprises processing means including:
    a memory for holding provisional telephone rental data relative to said independent station;
    control means for generating provisional telephone rental data for said independent station;
    wherein said authorization means is further configured such that:
        in response to a public numerical word requesting a connection with said auxiliary telephone network, said authorization processing means generate variable data and calculate transformations thereof using said designating key formed by secret said telephone rental data when said public numerical word requesting a connection verifies a predetermined condition relative to the authentication of said independent station by said authorization means,
        said authorization processing means transmit the variable data and said transformations thus calculated, to said auxiliary authorization means; and
    wherein said auxiliary authorization means is configured such that:
    said control means generates said provisional public telephone rental data;
    said control means generates said provisional secret telephone rental data and codes using said variables and said transformations thus received;
    said processing means transmit said provisional secret telephone rental data thus coded to said independent station accompanied by said public provisional telephone rental data thus generated; and
    wherein said independent station is configured such that:
        said coding/decoding means decipher said coded secret provisional telephone rental data thus received using said designating key created by said secret telephone rental data, and said processing means stores said public provisional telephone rental data thus received and said secret data thus decoded in said memory.

11. The apparatus rented in claim 10, wherein said provisional public and secret telephone rental data comprise a personal identification number of said independent station.

12. The apparatus recited in claim 10, wherein said public provisional telephone rental data comprise a public numerical word for the request for a call, a numerical word for identification of an operator, a numerical word relative to a class of service from said independent station and numerical data for rental.

13. The apparatus recited in claim 11, wherein said coding/decoding means code/decode said provisional personal identification number of said independent station as a function of variable data and transformation thereof by a cryptographic function using said designating key.

14. The apparatus recited in claim 11, wherein said coding/decoding means code/decode said provisional personal identification number of said independent station as a function of variable data, and transformations thereof by a cryptographic function using said designating key and using additional variable data generated by said control means of said auxiliary authorization means.

15. The apparatus recited in claim 1, wherein said authorization means correspond to a general center of authorization for all said independent stations and fixed terminals of said commuted network.

16. The apparatus recited in claim 10, wherein said auxiliary authorization means correspond to a general center of authorization for all said independent stations and fixed terminals of said auxiliary commuted network.

17. The apparatus recited in claim 1, wherein said authorization means is housed in said fixed terminal and connected to a general authorization center for all of said independent stations and fixed terminals of said commuted network.

18. The apparatus recited in claim 10, wherein said auxiliary authorization means is housed in said fixed terminal and connected to a general authorization center for all of said independent stations and fixed terminals of said auxiliary commuted network.

19. A method for remote loading of telephone rental data for use in a telephone installation having a fixed terminal connected to a commuted telephone network and an independent station for remote intercommunication with the fixed terminal following a request for a call from the independent station, the method comprising the steps of:
    i) in response to a public numerical word for the request of a call from the independent station accompanied by a public numerical word for identification of the independent station, and in the presence of a request signal verifying a predetermined condition relative to remote loading of telephone rental data, searching telephone rental data relative to the independent station stored in a memory of the independent station and searching data indicating an order for remote loading stored in an authorization memory of an authorization means in the independent station;
    ii) coding in a coding/decoding means, variable key data using a designating key data which is secret;

iii) in an authorization means for blocking telephone connection, authorizing transmission of public telephone rental data as well as secret telephone rental data, thus coded, to the independent station according to the data indicating the order for remote loading;

iv) in the independent station, decoding the coded secret telephone rental data thus received with the help of the designating key; and v) storing public rental data thus transmitted and the secret data thus decoded in the memory of the independent station.

20. A method for the remote loading of telephone rental data intended for use in a telephonic installation, having a fixed terminal connected to a commuted telephone network and an independent station for remote intercommunication with the fixed terminal following a request for call from the said independent station, the method comprising the steps of:

(1) in an authorization means for the independent station connected to the fixed terminal and provided with processing means for monitoring telephone rental data for the purpose of blocking the formation of a telephone connection, (i) in response to a public numerical word for the request of a connection to an auxiliary telephone network coming from an auxiliary authorization means, generating variable data, calculating transformations thereof using a designating key created by secret telephone rental data when the public numerical word for the request of a connection verifies a predetermined condition relative to authentication of the independent station by the authorization means, and (ii) transmitting the variable data and the transformation thereof thus calculated to the auxiliary authorization means; and (2) in an auxiliary authorization means holding provisional telephone rental data relative to the independent station and control means for generating provisional public telephone rental data for the independent station, (iii) generating provisional public telephone rental data, (iv) generating provisional secret telephone rental data and coding it using variable data and transformation thereof, (v) transmitting provisional secret telephone rental data thus coded to the independent station accompanied by the provisional public telephone rental data thus generated; and (3) in the independent station having a memory to store telephone rental data relative to the independent station and means for coding/decoding data and which is for remote intercommunication with an auxiliary commuted telephone network whose auxiliary authorization means are connected to the authorization means for the purpose of allowing data exchange with the said authorization means;

(vi) deciphering the coded secret provisional telephone rental data thus received using the designating key created by secret telephone rental data; and (vii) storing the non-secret provisional public telephone rental data thus received and the secret data thus decoded in the memory.

21. The method recited in claim 20, wherein the step (iv) further comprises generating additional variable data and coding the telephone rental data with the additional help of the additional variable data.

* * * * *